United States Patent
Weksler et al.

(10) Patent No.: US 12,210,608 B2
(45) Date of Patent: Jan. 28, 2025

(54) VEHICLE DEVICE AUTHORIZATION VIA SECONDARY DEVICE

(71) Applicant: Lenovo (Singapore) Pte. Ltd., Singapore (SG)

(72) Inventors: Arnold S. Weksler, Raleigh, NC (US); Sandy Scott Collins, Durham, NC (US); Neal Robert Caliendo, Jr., Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 583 days.

(21) Appl. No.: 17/111,056

(22) Filed: Dec. 3, 2020

(65) Prior Publication Data

US 2022/0179936 A1 Jun. 9, 2022

(51) Int. Cl.
| | |
|---|---|
| *G06F 21/35* | (2013.01) |
| *B60W 50/10* | (2012.01) |
| *B60W 50/12* | (2012.01) |
| *B60W 60/00* | (2020.01) |
| *G01C 21/34* | (2006.01) |

(52) U.S. Cl.
CPC ............. *G06F 21/35* (2013.01); *B60W 50/10* (2013.01); *B60W 50/12* (2013.01); *B60W 60/00188* (2020.02); *G01C 21/3484* (2013.01); *B60W 2540/045* (2020.02); *B60W 2540/215* (2020.02)

(58) Field of Classification Search
CPC . G06F 21/35; G06F 2221/2111; B60W 50/10; B60W 50/12; B60W 60/00188; B60W 2540/045; B60W 2540/215; G01C 21/3484; G01C 21/26
See application file for complete search history.

(56) References Cited

U.S. PATENT DOCUMENTS

| | | | |
|---|---|---|---|
| 2011/0181387 A1* | 7/2011 | Popelard | E05B 81/76 340/5.2 |
| 2014/0283136 A1* | 9/2014 | Dougherty | H04W 64/00 726/29 |
| 2015/0260529 A1* | 9/2015 | Petersen | G01C 21/26 701/522 |
| 2015/0302732 A1* | 10/2015 | Wright | H04N 21/42204 340/5.25 |
| 2016/0203332 A1* | 7/2016 | Wippler | G06F 21/6245 726/28 |
| 2018/0290627 A1* | 10/2018 | Hariri | B60R 25/245 |
| 2018/0290628 A1* | 10/2018 | Luke | B60R 25/246 |
| 2019/0310628 A1* | 10/2019 | Taveira | G08G 5/045 |
| 2020/0364776 A1* | 11/2020 | Ammoura | H04W 4/023 |
| 2022/0012356 A1* | 1/2022 | McFarland, Jr. | G06F 21/602 |

* cited by examiner

*Primary Examiner* — James J Lee
*Assistant Examiner* — Tawri M McAndrews
(74) *Attorney, Agent, or Firm* — FERENCE & ASSOCIATES LLC

(57) ABSTRACT

One embodiment provides a method, including: receiving, at an information handling device positioned within a vehicle, a command from a vehicle occupant to initiate a function; transmitting, responsive to the receiving and prior to initiation of the function, an authorization request to a secondary device designated as an authorization authority; determining, using a processor, whether confirmation of the authorization request is received from the secondary device; and initiating, responsive to determining that confirmation of the authorization request is received from the secondary device, the function. Other aspects are described and claimed.

8 Claims, 3 Drawing Sheets

VEHICLE DEVICE AUTHORIZATION VIA SECONDARY DEVICE

BACKGROUND

As technology has progressed, vehicles (e.g., cars, motorcycles, watercraft, etc.) have become equipped with more advanced information handling devices (e.g., navigation systems, digital assistants, remote controls, etc.). These devices are capable of storing various types of personal information and may also intelligently communicate with and/or control other components and devices within and/or outside of the vehicle. The presence of these devices generally provides a user with an improved driving experience.

BRIEF SUMMARY

In summary, one aspect provides a method, comprising: receiving, at an information handling device positioned within a vehicle, a command from a vehicle occupant to initiate a function; transmitting, responsive to the receiving and prior to initiation of the function, an authorization request to a secondary device designated as an authorization authority; determining, using a processor, whether confirmation of the authorization request is received from the secondary device; and initiating, responsive to determining that confirmation of the authorization request is received from the secondary device, the function.

Another aspect provides an information handling device positioned within a vehicle, comprising: a processor; a memory device that stores instructions executable by the processor to: receive a command from a vehicle occupant to initiate a function; transmit, responsive to receiving the indication and prior to initiation of the function, an authorization request to a secondary device designated as an authorization authority; determine whether confirmation of the authorization request is received from the secondary device; and initiate, responsive to determining that confirmation of the authorization request is received from the secondary device, the function.

A further aspect provides a product, comprising: a storage device that stores code, the code being executable by a processor and comprising: code that receives a command from a vehicle occupant to initiate a function; code that transmits, responsive to receiving the command and prior to initiation of the function, an authorization request to a second device designated as an authorization authority; code that determines whether confirmation of the authorization request is received from the secondary device; and code that initiates, responsive to determining that confirmation of the authorization request is received from the secondary device, the function.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
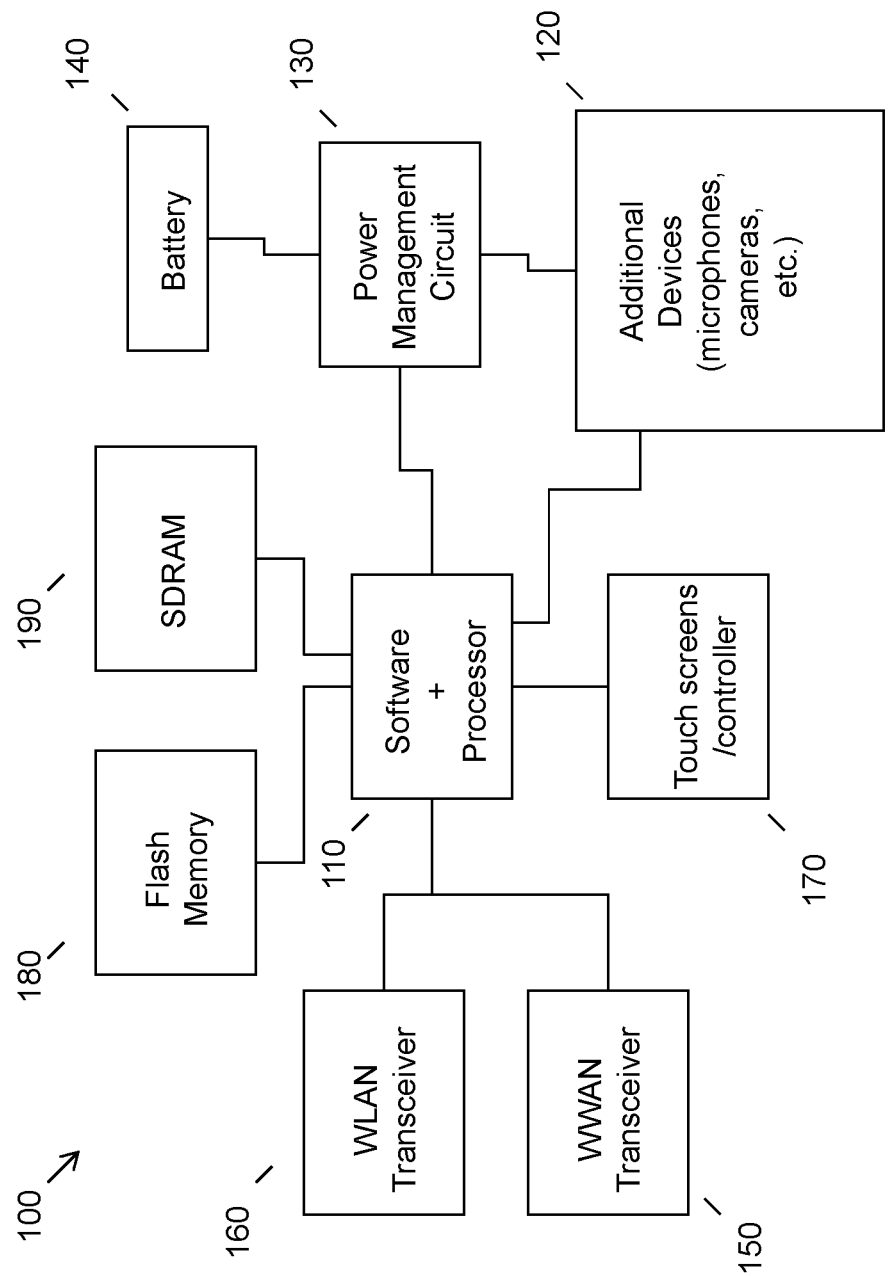
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

It is not uncommon for individuals to provide a variety of different types of personal information to their vehicle devices. For example, a user may input and store the addresses of one or more frequently visited places (e.g., their home, place of work, child's school, etc.) into their vehicle's navigation system. This information may then be quickly accessed and utilized when needed. As another example, a user may store one or more passcodes into a vehicle device that may subsequently be transmitted by the vehicle device to another device to perform a particular function (e.g., an onboard digital assistant may transmit a garage door code to an external controller device that is responsible for opening and closing a garage door, etc.).

Generally, an individual's personal information can be relatively easily accessed once it is provided to a vehicle device. More particularly, absent any login code or other type of upfront protections, any user operating the vehicle can access the information unimpeded. Solutions exist in which a user may attempt to disguise and/or hide certain aspects of their personal information. For example, a user may create a unique name for locations of high interest (e.g., their home, etc.) so that other users may not be able to easily identify where those locations are. However, the actual location is still stored on the system and once the location's true identity is discovered another user, potentially a bad actor, may be able to travel to that location. Additionally, whenever the owner transfers ownership of their vehicle (e.g., through an official trade or sale, etc.), they must remember to manually delete any personal information they don't want shared from the vehicle.

Accordingly, a method is provided that authorizes an action to be performed by a vehicle device. In an embodiment, an indication may be received by an electronic device positioned within a vehicle to perform a function (e.g., a data access function, a data transmit or communications function, etc.). An embodiment may then transmit an authorization request to perform the function. In an embodiment, the authorization request may be a request transmitted to one or more other devices (e.g., one or more proximate devices, one or more devices associated with an authorized user of a vehicle housing the vehicle device, etc.). Additionally or alternatively, in another embodiment, the authorization request may be a challenge transmitted to a current occupant of the vehicle (e.g., a challenge to perform one or more gestures, a challenge to touch one or more vehicle components, a combination thereof, etc.). Responsive to determining that the authorization request is approved (e.g., by receiving a verification from the other device, by receiving an indication that the correct gesture or component touch sequence was provided or performed, etc.) an embodiment may thereafter initiate the function. If the authorization request is not approved, an embodiment may not initiate the function and/or may dynamically initiate one or more other data protection functions. Such a method may therefore strengthen security measures for information that is stored on vehicle devices.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
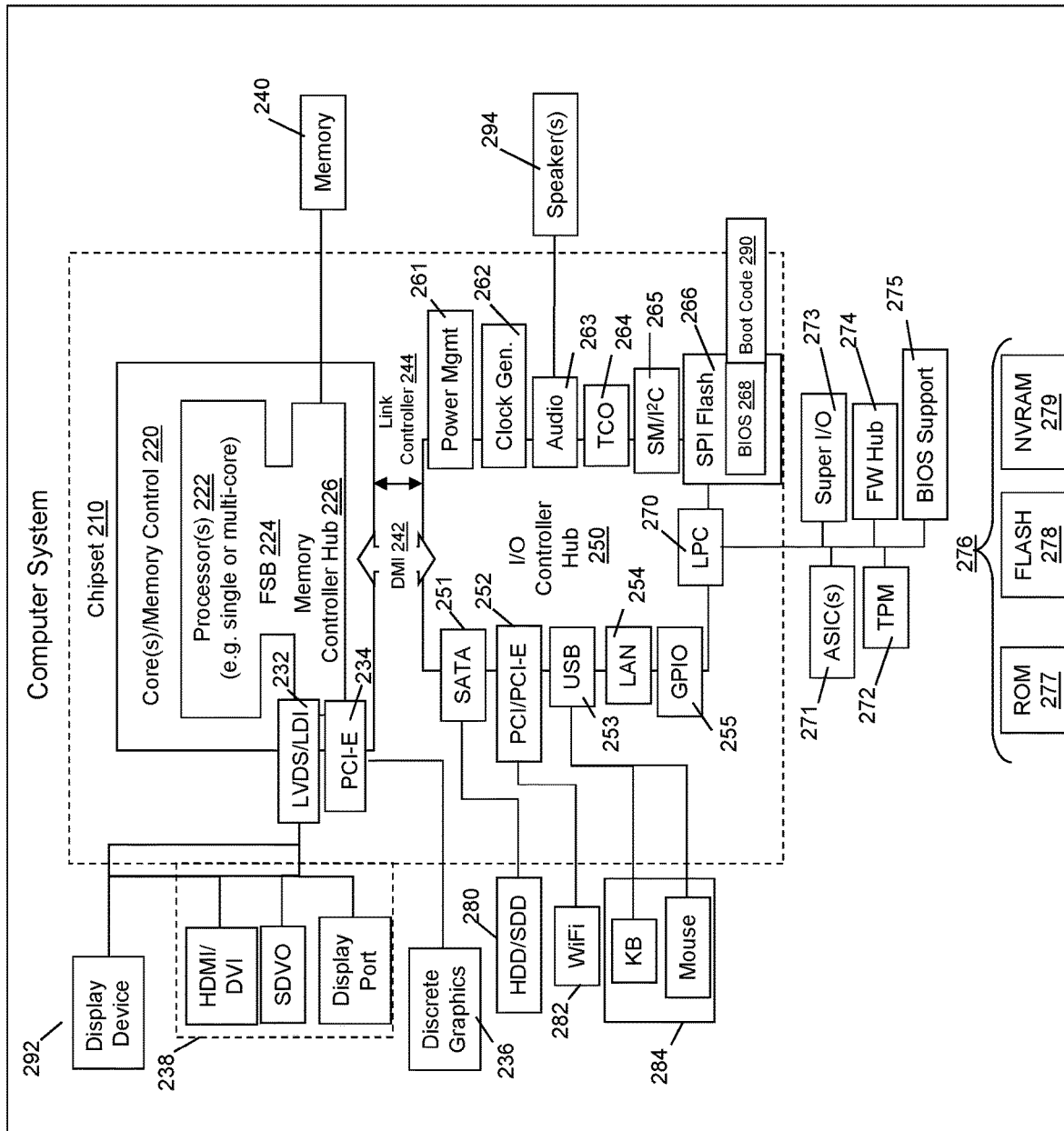
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, NC, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in vehicle devices capable of communicating with one or more other devices and/or capable of providing output to a user.

Figure 3:
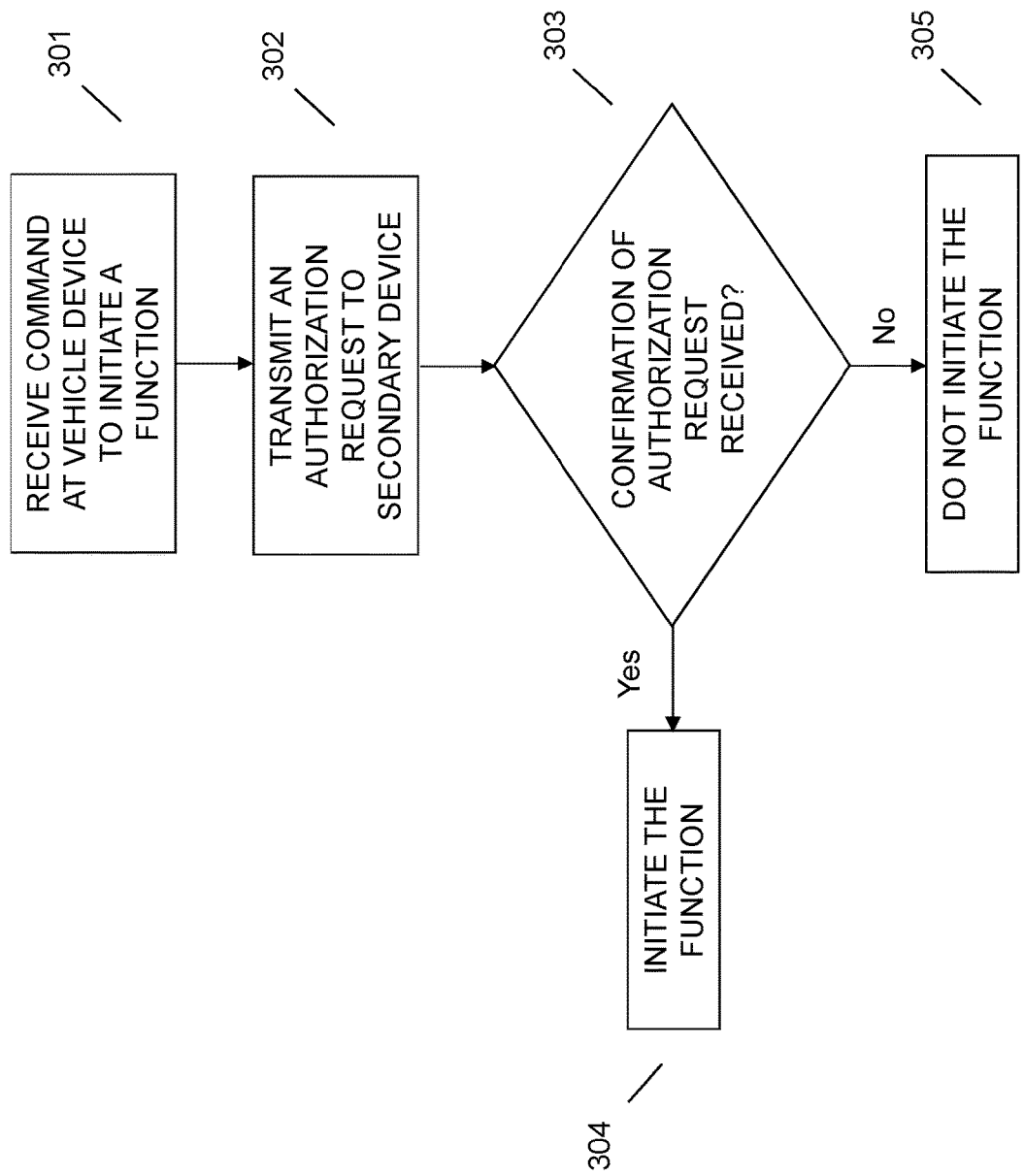
FIG. 3 illustrates an example method of authorizing an action to be performed by a vehicle device.

Referring now to FIG. 3, a method for authorizing a vehicle device to initiate a function is provided. In an embodiment, an indication may be received at a vehicle device to perform a function. In the context of this application, a vehicle device may be virtually any type of computing device capable of storing data and/or capable of communicating with other devices and that is resident in, or integrated into, a vehicle. For example, the vehicle device may be a navigation system, a digital assistant device, a garage door opener, another type of computing device, etc.

In an embodiment, the indication to perform a function may result from user interaction with the vehicle device. More particularly, a vehicle occupant (e.g., a vehicle operator, a vehicle passenger, etc.) may command (e.g., via touch input, voice input, gesture input, keyboard input, another type of input modality recognizable by the vehicle device, etc.) the vehicle device to perform a function. The function may be virtually any type of conventional function capable of being executed by a vehicle. For instance, in an embodiment the function may correspond to a data access function in which some type of data (e.g., stored in a database located locally on the vehicle device or remotely on another device or server, etc.) may be accessed and retrieved. As a non-limiting example, a user may request a vehicle's navigation system to provide them directions or transport them to a location associated with a stored address. In another embodiment, the function may correspond to a command transmission function directed to at least one other device. More particularly, a command transmission function may involve a communication or command sent from the vehicle device to another device (e.g., using conventional wireless communication means, etc.) to perform a function. For example, a user may request a digital assistant device to scan for and communicate with gate or garage door sensors to open a driveway gate or garage door.

At 302, an embodiment may transmit an authorization request responsive to receiving the indication. In an embodiment, the transmission of the authorization request may occur prior to actual performance of the function and may be transmitted using one or more conventional wireless communication means (e.g., via a WI-FI connection, a mobile device network connection, BLUETOOTH, etc.).

In an embodiment, the authorization request may be transmitted to an authorized secondary device. In this regard, the authorization request may seek approval from the authorized secondary device to initiate the function. In the context of this application, an authorized secondary device may be a device that has been previously designated, or that has been dynamically identified, as an authorization authority. For example, the authorized secondary device may be a device that is included in a stored list of authorized devices known to be associated with an authorized user of the vehicle (e.g., a vehicle owner's smart phone, wearable device, tablet, etc.). As another example, the authorized secondary device may be a device that has previously and repeatedly paired with one or more vehicle devices via a wired or wireless connection (e.g., via a USB port, via a BLUETOOTH connection, via a near-field communication (NFC) connection, etc.).

In an embodiment, the transmission to the secondary device may be generalized or targeted. Regarding the former, an embodiment may transmit the authorization request to any device within a predetermined radius of the vehicle device. Regarding the latter, an embodiment may transmit the authorization request to a specific secondary device. More particularly, a database accessible by the vehicle device may contain communication information (e.g., a phone number, a device signature, etc.) for the one or more authorized secondary devices. An embodiment may utilize this communication information to transmit the authorization request to the authorized secondary device.

In an embodiment, the authorization request may contain a prompt directing a vehicle occupant to perform a confirmation action. In this regard, the prompt may demand performance of a particular gesture, action, or series of gestures and/or actions, etc., prior to initiating the function. In an embodiment, the prompt may be presented to the vehicle occupant directly via an audio and/or visual prompt provided by an output device associated with the vehicle device (e.g., a display screen, a speaker, etc.). Alternatively, the prompt may be transmitted to the authorized secondary device and presented thereon. In such a situation, if a vehicle occupant is not in possession of an authorized secondary device then they may never be apprised of the prompt and may correspondingly be unable to perform the confirmation action.

As one example of a confirmation action, the prompt may request a user of the authorized secondary device to select an identity confirmation button presented to them on the authorized secondary device. In another example, the prompt may request the user to speak a passcode that may authorize the vehicle device to initiate the function. As another example, the prompt may request the user to perform an authorization gesture that may give the vehicle device an indication that the current user is an authorized user. The authorization gesture may be a single gesture (e.g., a thumbs up gesture, etc.), a plurality of gestures (e.g., a thumbs up gesture, a thumbs down gesture, a hand wave gesture, etc.), or a series of gestures performed in a predetermined order (e.g., a thumbs up gesture first, then a hand wave gesture, then concluding with a thumbs down gesture, etc.) that the authorized user previously trained the vehicle device to recognize and associate with the authorized user. In yet another similar example, the prompt may request the user to touch a specific vehicle component that may give the vehicle device an indication that the current vehicle occupant is an authorized user. In this situation, the authorization gesture may request the user to touch a single vehicle component (e.g., the rearview mirror, etc.), a plurality of vehicle components (e.g., the rearview mirror, the steering wheel, the glove compartment, etc.), or a series of vehicle components in a predetermined order (e.g., the steering wheel first, followed by the glove compartment, then concluding with the rearview mirror, etc.). Similar to the foregoing, an authorized user may have previously trained the vehicle device to recognize and associate these vehicle component touching actions with the authorized user.

At 303, an embodiment may determine whether confirmation of the authorization request was received. In an embodiment, confirmation of the authorization request may manifest differently based upon how the authorization request was transmitted. For instance, if the vehicle device transmitted an authorization request to a secondary device, then confirmation of the authorization request may correspond to receipt of an indication from the secondary device that the secondary device is an authorized secondary device located within the predetermined broadcast radius of the transmission and/or that the vehicle device has authorization to perform the function. In another example, confirmation of the authorization request may correspond to an identification that a successful completion of a confirmation action was performed (e.g., by identifying receipt of a correct passcode, by identifying receipt of a correct gesture or series of gestures, by identifying a correction sequence of vehicle component selections, etc.).

Responsive to determining, at 303, that a confirmation of the authorization request was received, an embodiment may initiate, at 304, the function using the vehicle device. Conversely, responsive to determining, at 303, that a confirmation of the authorization request was not received, an embodiment may not initiate, at 305, the function. In an embodiment, the vehicle device may provide a notification to a vehicle occupant that the requested function could not be initiated. Additionally or alternatively, an embodiment may dynamically initiate one or more security measures (e.g., dynamically delete data, prevent further operation of the vehicle, contact a local authority, etc.) responsive to detecting that the authorization request was denied a predetermined number of times (e.g., 1 time, 3 times, 5 times, etc.).

As a non-limiting practical example of the foregoing concepts, an operator of a car may command the car's navigation system to provide them directions to a predetermined location (e.g., a "Home" location, a "Work" location, a "Favorite" or frequently visited location, etc.). Responsive to receiving this request, an embodiment may attempt to transmit an authorization request to a known authorized secondary device. The transmission of the authorization request may be broadcast within a predetermined radius of the vehicle device (e.g., the predetermined radius may substantially correspond to the footprint of the vehicle, etc.). If the vehicle device does not receive confirmation of the authorization request, an embodiment may conclude that the authorized secondary device is not within the predetermined radius (i.e., the authorized secondary device may not be in the vehicle) and may therefore not provide the direction information. In an embodiment, if the user of the vehicle repeatedly attempts to obtain the directions to the "Home" location, then an embodiment may dynamically delete that information from its knowledge source.

In another non-limiting practice example, a user may attempt to open a garage door by interacting with a garage door opener inside of a vehicle (e.g., a vehicle parked outside of the home, etc.). Responsive to receiving this request, an embodiment may request that the user touch an interior vehicle component that was previously designated by the authorized user as an "answer" to a security challenge. If the user touches the wrong component a predetermined number of times, then an embodiment may conclude that the current user is not the authorized user and may not open the garage door. Additionally or alternatively, the vehicle device may send (e.g., using stored communication information, etc.) an alert notification of this event to a known device associated with the authorized user (e.g., a vehicle owner's smart phone, etc.) or even to an authority (e.g., the local police department, a third party security company, etc.).

In an embodiment, some or all of the functions capable of being executed by the vehicle device may be associated with an assigned security level. For example, all media playing requests, cabin temperature control requests, navigation requests to specific public locations (e.g., restaurants, parks, gas stations, etc.), and other requests that pose no security risk to an authorized user of the vehicle may be assigned a low security level. Conversely, certain high-risk requests (e.g., navigation requests to private locations such as an individual's home or work, unlock requests to open secured objects such as a garage door or gate, etc.) may be assigned a high security level. In an embodiment, those functions assigned a low security level may be immediately performed whereas those functions assigned a high security level may only be performed responsive to receiving a confirmation of an authorization request, as described above.

The various embodiments described herein thus represent a technical improvement to conventional methods for authorizing a vehicle device to perform a function. Using the techniques described herein, an embodiment may receive an indication at a vehicle device to initiate a function. An embodiment may then transmit an authorization request to either a secondary device or directly to a user of the vehicle. Thereafter, an embodiment may determine whether confirmation of the authorization request was received (e.g., that an authorized secondary device is present within a vehicle device's transmission radius, that a vehicle occupant correctly provided a passcode or gesture or correctly touched a particular vehicle component, etc.). Responsive to determining that confirmation of the authorization request was not received by the vehicle device, the function may not be initiated and/or one or more security measures may be dynamically implemented. Such a method may provide improved security for data access requests and/or function performance requests facilitated by vehicle occupants.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, at an information handling device positioned within a vehicle, a command from a vehicle occupant to initiate a function;
   assigning a security level to the command based upon a security risk to an authorized user;
   transmitting, responsive to the receiving and the assigning, and prior to initiation of the function, an authorization request to a secondary device designated as an authorization authority, wherein the authorization request comprises a prompt directing the vehicle occupant to perform a confirmation action;
   determining, using a processor, whether confirmation of the authorization request is received from the secondary device based upon a correct sequence of selecting vehicle components by the vehicle occupant, wherein the determining comprises determining whether the secondary device is within a predetermined radius of the vehicle; and
   initiating, responsive to determining that confirmation of the authorization request is received from the secondary device, the function.

2. The method of claim 1, wherein the function corresponds to a navigation function to a predetermined location.

3. The method of claim 2, further comprising receiving, responsive to determining that confirmation of the authorization request is not received from the secondary device, an indication to delete navigation data associated with the predetermined location.

4. The method of claim 1, wherein the secondary device is associated with an authorized user of the vehicle.

5. An information handling device positioned within a vehicle, comprising:
   a processor;
   a memory device that stores instructions executable by the processor to:
   receive a command at the information handling device from a vehicle occupant to initiate a function;
   assign a security level to the command based upon a security risk to an authorized user;
   transmit, responsive to receiving the indication and the assigning, and prior to initiation of the function, an authorization request to a secondary device designated as an authorization authority, wherein the authorization request comprises a prompt directing the vehicle occupant to perform a confirmation action;
   determine whether confirmation of the authorization request is received from the secondary device based upon a correct sequence of selecting vehicle components by the vehicle occupant, wherein the determining comprises determining whether the secondary device is within a predetermined radius of the vehicle; and
   initiate, responsive to determining that confirmation of the authorization request is received from the secondary device, the function.

6. The information handling device of claim 5, wherein the function corresponds to a navigation function to a predetermined location.

7. The information handling device of claim 6, wherein the instructions are further executable by the processor to receive, responsive to determining that confirmation of the authorization request is not received, an indication to delete navigation data associated with the predetermined location.

8. A product, comprising:
   a storage device that stores code, the code being executable by a processor and comprising:
   code that receives a command from a vehicle occupant to initiate a function;
   code that assigns a security level to the command based upon a security risk to an authorized user;
   code that transmits, responsive to receiving the command and the assigning, and prior to initiation of the function, an authorization request to a second device designated as an authorization authority, wherein the authorization request comprises a prompt directing the vehicle occupant to perform a confirmation action;
   code that determines whether confirmation of the authorization request is received from the secondary device based upon a correct sequence of selecting vehicle components by the vehicle occupant, wherein the determining comprises determining whether the secondary device is within a predetermined radius of the vehicle; and
   code that initiates, responsive to determining that confirmation of the authorization request is received from the secondary device, the function.

* * * * *